Oct. 27, 1925.

E. M. HEWLETT ET AL

1,559,524

MEANS FOR ACCURATELY REPRODUCING ANGULAR MOVEMENTS

Filed Sept. 15, 1921

Inventors:
Edward M. Hewlett
Waldo W. Willard,
by Albert G. Davis
Their Attorney.

Patented Oct. 27, 1925.

1,559,524

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

MEANS FOR ACCURATELY REPRODUCING ANGULAR MOVEMENTS.

Application filed September 15, 1921. Serial No. 501,006.

*To all whom it may concern:*

Be it known that we, EDWARD M. HEWLETT and WALDO W. WILLARD, citizens of the United States, residing at Schenectady, in the county of Schenectady, State of New York, have invented certain new and useful Improvements in Means for Accurately Reproducing Angular Movements, of which the following is a specification.

This invention relates to means for accurately reproducing angular movement, and has for its object the provision of improved means whereby an electric motor may be controlled to reproduce angular movement with great accuracy.

Our invention relates more specifically to the accurate reproduction at a remote point of angular movements. Such devices are in more or less common use as, for instance, where a moving object, such as a telescope, is moved through a certain angular distance, and it is desired that another object at a remote point should follow this movement. The remote object may be and frequently is an indicator, which gives the angular distance through which the object has been moved. In some classes of work, for example, in the training of guns upon a target designated by means of a telescope in an observing station, it is essential that the angular movement of the telescope be reproduced with a great degree of accuracy. Such a reproduction may be made by means of an indicator which shows at all times the exact position of the object.

One of the well known systems for causing one object to follow the angular movement of another object at a distance is the so-called selsyn system. This system comprises a transmitting device and an interconnected receiving or reproducing device. The transmitting and reproducing devices are similar in construction, and are each provided with a single phase field winding and a polyphase armature winding, the windings being relatively movable. The field windings are connected to a suitable source of alternating current supply while the armature windings are interconnected. Voltages are induced in the armature windings by their respective field windings. These voltages normally balance, but movement of the rotor of either device disturbs this voltage relation, and the resulting currents set up a torque on the rotor of the other device, thus causing it to follow the movement of the first. By connecting one of the devices, the transmitter, to the object, the angular movements of the object will be reproduced by the other, the reproducer.

In order to obtain a high degree of accuracy, it is desirable to use two systems for reproducing the movement of the object, one of which, the coarse system, reproduces the movement at a low ratio, while the other, the fine system, reproduces the movement at a high ratio. In applications where an indicating dial can be driven by each reproducer, the position of the object can be determined by comparing the positions of the dials, but in installations to which our invention relates, in which it is desired to control a single device, such, for example, as an indicator, it is necessary to drive the indicator in response to the combined movement of the coarse and fine reproducers. The indicator must be adjusted by the coarse reproducer to a definite degree of accuracy, within which the fine reproducer becomes available for the accurate adjustment. This we accomplish by driving the indicator by an auxiliary electric motor, hereinafter designated as a servo motor, and controlling the servo motor by the combined action of the coarse and fine reproducers.

In the application of selsyn systems for the reproduction of angular movement in this manner, it is essential that the reproducers should be continuously driven with the moving object so as to always be in synchronism with their respective transmitter, irrespective of the lag of the servo motor. That is to say, the reproducers must always move when the moving object moves and must not be prevented from freely following such movement. Otherwise the interconnected armature windings are subjected to overheating from the continued flow of equalizing currents. In carrying out our invention we employ two commutating devices driven by the coarse and fine receivers, respectively, the brushes cooperating with the commutating devices being driven by the servo motor, and suitable relays all cooperating to control the servo motor, roughly in response to the coarse reproducer and accurately in response to the fine reproducer.

For a more complete understanding of our invention reference should be had to the accompanying drawings in which Figs. 2, 3 and 4 show various modifications of our invention; while

Figure 1:
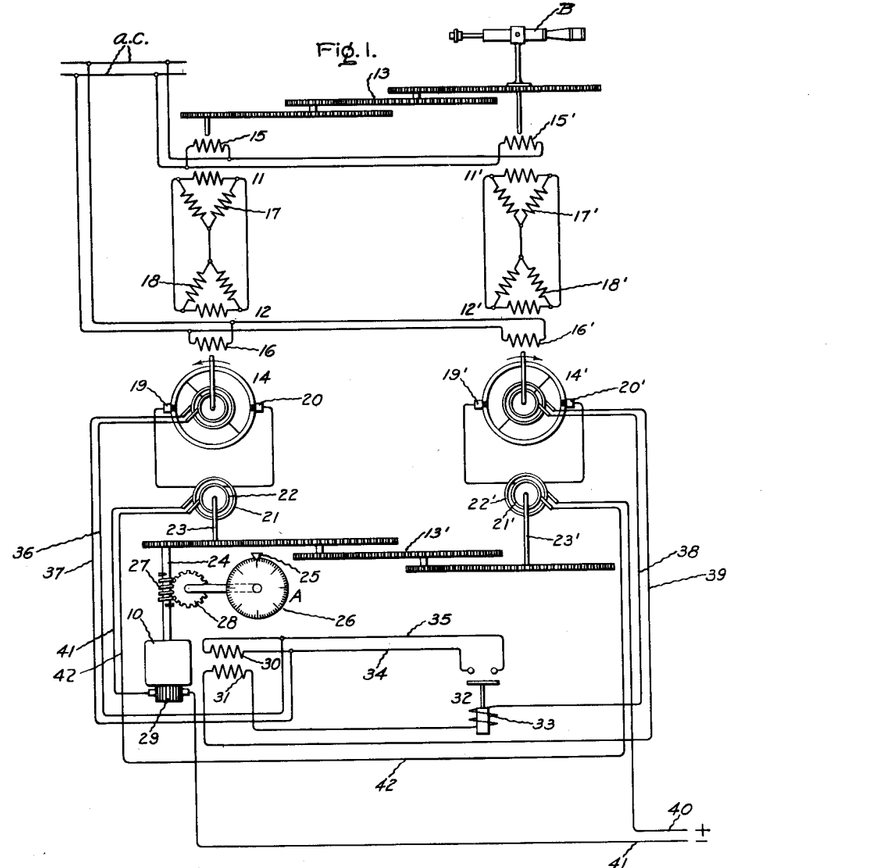
Fig. 1 shows in diagrammatic form a system for the reproduction of angular movement embodying our invention.

Referring to Fig. 1 of the drawings, in one form of our invention a position indicator A is actuated by an electric motor 10 so as to indicate the position of a remote telescope B. The servo motor is controlled in response to movement of the telescope by two selsyn systems for the transmission of angular movement, consisting of selsyn generators 11 and 11' and selsyn receiving motors or reproducers 12 and 12' connected, respectively, thereto. Generator 11 is operated at high speed with respect to the telescope at some suitable ratio, such as 72:1, by means of a suitable gear train 13, while generator 11' is connected to the telescope to be rotated at a suitable low speed ratio, such as 1:1 therewith. The selsyn receiving motors 12 and 12' are connected to drive commutators 14 and 14', each consisting of two 180 degree insulated conducting segments which are electrically connected to slip rings. The generators and motors are similar in construction, having single phase field windings 15, 15', 16 and 16' on their rotors and three phase armature windings 17, 17', 18 and 18' on their stators. The field windings are energized from a suitable source of alternating current supply. Like points of stator windings 17 and 18 are interconnected, and likewise like points of stator windings 17' and 18'.

The operation of systems of this general character for the transmission of angular movement is well known in the art. Voltages are induced in the three phase stator windings of the generators and motors by the single phase field windings on the associated rotors. When the rotors of the generator and motor in each system are in the same angular positions with respect to their stators, the induced voltages in the interconnected armature windings are equal and opposite and consequently no current is set up in the armature windings. If the rotor of the generator is turned and held in its new position, the voltages no longer counterbalance, whereby equalizing currents are caused to flow in the armature windings. The equalizing currents exert a torque on the rotor of the motor, causing it to take up a position corresponding to the position of the generator rotor. Angular movement imparted to generators 11 and 11' is therefore reproduced at any desired distance by motors 12 and 12'.

Figure 5:
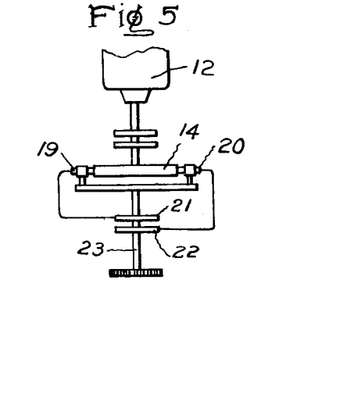
Fig. 5 is a detail of the commutator.

Cooperating with commutator 14 are two opposite collector brushes 19 and 20 which are electrically connected to slip rings 21 and 22, respectively. The brushes and slip rings are mounted on a shaft 23 as shown in Fig. 5 and are turned therewith through suitable gearing by driving shaft 24 of the servo motor. A similar collecting device consisting of brushes 19' and 20' and slip rings 21' and 22' cooperates with commutator 14'. These brushes and slip rings are carried on a shaft 23' which is geared to shaft 23 through gear train 13' in the same ratio as that between generators 11 and 11'. The brushes are slightly wider than the insulating segments on the commutators, and consequently are in contact with both conducting segments when in the position shown in the drawings.

The indicator A consists of a stationary pointer 25 which cooperates with a rotatable dial 26 calibrated in degrees and minutes. The dial is driven by the servo motor from a worm gear 27 on the servo motor shaft 24 and a spiral gear 28 cooperating therewith and attached to the driving shaft of the dial. The gear ratio between the servo motor shaft and the dial 26 is equal to the gear ratio between the servo motor shaft and shaft 23'.

The servo motor 10 is of the direct current series type, having an armature 29 and two field windings 30 and 31 which are wound in the same direction. A relay 32 having an actuating coil 33 in the circuit of field winding 31 governs the energization of field winding 30 in such manner that when field winding 31 is energized, the relay coil 33 causes the armature of the relay to pick up, short-circuiting field winding 30 through conductor 34, the relay contacts, and conductor 35. It is therefore impossible for both field windings to be energized at the same time. Field winding 30 is connected by conductors 36 and 37 and brushes across the slip rings of commutator 14, while field winding 31 is connected by conductors 38 and 39 and brushes across the slip rings of commutator 14'.

Conductors 40 and 41 are connected to a suitable source of direct current supply. Conductor 40 leads through a brush to slip ring 22', while conductor 41 leads through armature 29 and a brush to slip ring 21. With the commutators and collector brushes in the positions shown in the drawing, the selsyn systems being stabilized, the indicator A is adjusted to indicate the position of the telescope, and a circuit is established from the direct current source of supply through conductor 40 to slip ring 22' and brush 20', through the two conducting segments of commutator 14' to brush 19' and slip rings 21', through conductor 42 to slip ring 22 and brush 20, through the two conducting segments of commutator 14 to brush 19 and slip ring 21, then through conductor 41 and armature 29 back to the source of supply. The fields 30 and 31 are, therefore, both short-circuited by the commutators, and armature 29 is connected directly across the supply source. The armature is provided with sufficient resistance to prevent overheating and excessive current flow under these conditions. As long as the fields of the servo motor are deenergized, the servo motor is inactive and the indicator is consequently held fixed. The commutators and their respective collector brushes normally are in the angular relation shown in the drawing.

Assuming that the telescope B is moved rapidly through a considerable angle in azimuth, whereby the angular position of the rotors of generators 11 and 11' is changed, the operation of our invention is as follows: Upon movement of the generator rotors, the motor rotors immediately follow, moving the commutators therewith and breaking the commutator short circuits for the field windings of the servo motor. Field winding 30 is immediately short-circuited by the closing of relay 32. Assuming that the commutators are moved in the directions indicated by the arrows, the servo motor circuit is established through conductor 40 to slip ring 22', brush 20', the upper segment of commutator 14', and the slip ring connected thereto, through conductor 38, coil 33, field winding 31, and conductor 39 to the other slip ring of commutator 14', the lower segment of commutator 14', brush 19', and slip ring 21', through conductor 42 to slip ring 22, brush 20, the lower segment of commutator 14, and the slip ring connected thereto, through conductors 37, 34, 35, and 36 to the other slip ring of commutator 14, the upper segment, brush 19, and slip ring 21, thence through conductor 41 and armature 29 back to the source of supply. The servo motor rotates in a direction to give the proper indication of the position of the telescope on indicator A.

Shafts 23 and 23' geared to the servo motor shaft 24 are rotated by the servo motor, shaft 23 being rotated in a direction to follow the movement of commutator 14 and shaft 23' in a direction to follow the movement of commutator 14', the collector brushes and slip rings carried by the respective shafts moving therewith. It will be observed that as long as brushes 19' and 20' are in position with respect to commutator 14' to cause field winding 31 to be energized, the servo motor will continue to operate entirely independently of the position of brushes 19 and 20 with respect to commutator 14. The servo motor continues to operate to adjust the indicator until brushes 19' and 20' have followed the movement of commutator 14' and bridge the insulating segments thus short-circuiting field winding 31 and deenergizing relay coil 33. Relay 32 then drops, opening the shunt around field winding 30. The servo motor continues to operate in the same direction with field winding 30 energized to complete the accurate adjustment of the indicator until winding 30 is short-circuited through conductors 36 and 37 and the commutator 14 by the movement of brushes 19 and 20 in position as shown in the drawings to bridge the insulating segments of commutator 14.

It will be observed that the servo motor has been controlled to reproduce at a certain desired ratio the angular movement imparted to commutator 14', the adjustment of the servo having been made with great accuracy by means of the sensitive commutator 14. Since the ratio between the servo motor and the indicator dial is equal to the ratio between the servo motor and commutator 14', the dial has been moved through the angle of movement of the telescope and therefore accurately indicates its position.

In following the movement of the telescope, commutator 14 may make a large number of revolutions, while commutator 14' moves through only the comparatively small angle of movement of the telescope. Due to its greater range of movement, commutator 14 is much more sensitive. In case the movement of the telescope is not sufficient to cause commutator 14' to take control, the servo motor will be controlled entirely by commutator 14. Should the collecting device of commutator 14 be moved too far while commutator 14' is in control, the servo motor will be reversed when the control is shifted to commutator 14. The direction in which the commutators are moved determines the direction of the excitation of the field windings and hence the direction of rotation of the servo motor.

It will be observed that should commutator 14' be moved through more than 180 degrees with respect to its brushes 19' and 20', the servo motor will be reversed and the brushes consequently moved to complete a 360 degree lag with respect to the commutator, whereupon the servo motor will be stopped. This results in no error in the reading on the indicator, however, since the indicator does not take into consideration the number of complete revolutions of the telescope but only the position of the telescope in a particular revolution. Commutator 14' will, therefore, always correctly control the direction of operation of the servo motor whenever the lag of the servo motor is sufficient to cause it to take control, with the exception that should the commutator come to rest when the brushes 19' and 20' are bridging the insulating segments with a lag of exactly 180 degrees, or any odd multiple thereof, the servo motor will be stopped. This condition is very unstable, however, since a slight relative movement between the brushes and the commutator to break the short-circuit will control the servo motor in a direction to move the brushes to their correct angular relation with the commutator, or to complete a 360 degree lag, depending on the direction of the relative movement. Therefore the servo motor is controlled to give an accurate reading on the indicator for any position of the brushes 19′ and 20′ except when they lag 180 degrees or any odd multiple thereof.

Figure 2:
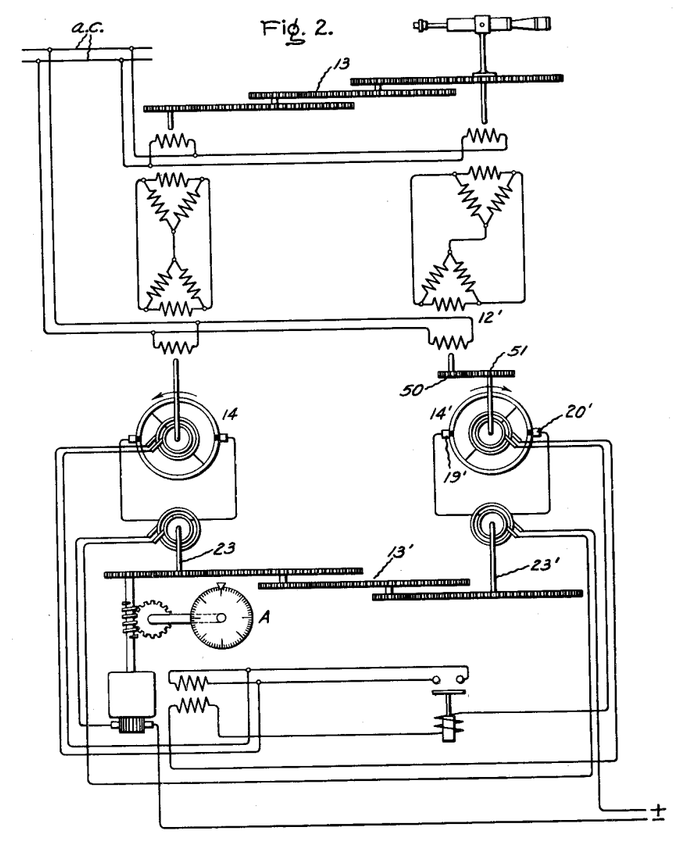

In Fig. 2 we have shown a modification of our invention in which the servo motor is controlled to give an accurate reading on the indicator at all times. The low speed selsyn motor 12′ is connected through gears 50 and 51 to the commutator 14′ so as to drive the commutator at one half the speed of the telescope. Gear train 13′ has twice the ratio of gear train 13 in order to give the same speed ratio between shafts 23 and 23′ that exist between commutators 14 and 14′. In this arrangement should the brushes 19′ and 20′ lag behind commutator 14′ by an amount equal to 180 degrees or any multiple thereof, it will be observed that the indicator A will lag 360 degrees or some multiple thereof, and hence indicate accurately the position of the telescope in a particular revolution. In all other respects the operation of this modification of our invention is the same as described in connection with Fig. 1.

Figure 3:
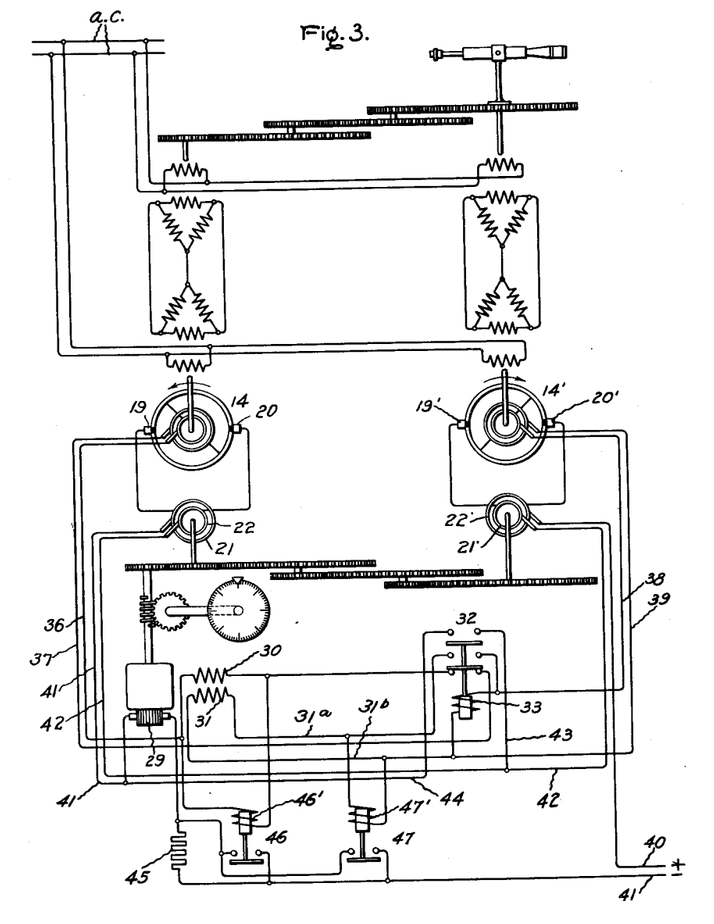

Referring to Fig. 3, showing a modified form of our invention adapted for use with either an alternating or direct current servo motor, the relay 32 is provided with three pairs of contacts, an upper pair in a shunt circuit for commutator 14, a middle pair in series with field winding 31, and a lower pair in series with field winding 30. Operating coil 33 of relay 32 is connected across conductors 38 and 39. The object of this arrangement is to short circuit commutator 14 and thus eliminate its contact resistance, when commutator 14′ is in control and to maintain the circuit of the field winding which is not in use open instead of merely short-circuiting it as disclosed in Fig. 1. In this manner all possibility of induction between the field windings is avoided, and the system can therefore be used with an alternating current servo motor. A resistance 45 is also included in the circuit in series with the servo motor armature when the servo motor is not in operation for the purpose of limiting the current to a safe value. Connected in short circuits for resistance 45 are two relays 46 and 47, the operating coils 46′ and 47′ of which are connected across field windings 30 and 31, respectively, so that upon the energization of one of the field windings to start the motor one of the coils 46′ and 47′ is energized to close its respective relay and short circuit the resistance. By means of resistance 45 it is possible to use a servo motor having a very low armature resistance. Obviously resistance 45 is not essential to this modification of our invention in case the resistance of the armature is sufficient to limit the armature current to a safe value when the field windings are deenergized.

Assuming that commutators 14 and 14′ are moved in response to movement of the telescope as described in connection with Fig. 1 in the directions indicated by the arrows and through an angle great enough to open the short circuit through commutator 14′, the operation of this modification of our invention is as follows: A circuit is momentarily established as described in connection with Fig. 1 through coil 33 and field winding 30 of the motor. This circuit is as follows: from supply conductor 40 to slip ring 22′, thence to brush 20′, the upper segment of commutator 14′ and the slip ring connected thereto, through conductor 38, coil 33, conductor 39 and its slip ring of commutator 14′ to the lower segment of the commutator, thence to brush 19′, slip ring 21′, conductor 42, slip ring 22, brush 20, one of the segments of commutator 14 as the case may be, for example, the lower, conductor 37, the lower pair of contacts of relay 32, field winding 30, conductor 36, the upper segment of commutator 14, brush 19, slip ring 21, conductor 41, and thence through the armature 29 of the motor and resistance 45 back to supply conductor 41. Coil 33 immediately picks up relay 32, thus opening the circuit through the lower pair of contacts to field winding 30, closing a circuit through the middle pair of contacts of relay 32 and conductors 31ᵃ and 31ᵇ to field winding 31 in parallel with coil 33, and closing a shunt circuit for commutator 14 from conductor 42 through conductor 43, the upper pair of contacts of relay 32 and conductor 44 to conductor 41. Coils 47′ picks up relay 47 upon the energization of field winding 31, closing a short circuit around resistance 45. The servo motor now operates in the direction determined by the movement of commutator 14′ at the same time moving brushes 19′ and 20′ toward the short circuiting position. When the brushes have been moved in position to bridge the insulating segments of commutator 14′, field winding 31 and coil 33 are short circuited. Relay 32 then drops, opening the shunt circuit through the upper pair of contacts for commutator 14, opening the circuit through the middle pair of contacts for field winding 31, and closing the circuit through the lower pair of contacts for field winding 30. The circuit of coil 47′ is also opened by the middle pair of contacts of relay 32, and relay 47 consequently drops out. The short circuit around resistance 45 is maintained, however, by the picking up of relay 46 by its coil 46′ when field winding 30 is energized. The servo motor now continues in operation under the control of commutator 14 until brushes 19 and 20 are moved in position to bridge the insulating segments of commutator 14 and short circuit field winding 30, thus stopping the motor. Coil 46' of relay 46 is also short circuited, and relay 46 consequently drops out opening the short circuit around resistance 45. The motor is maintained inoperative with its field windings deenergized and its armature connected across the supply source in series with resistance 45 until further movement of one or both of commutators 14 and 14' in response to movement of the telescope.

Figure 4:
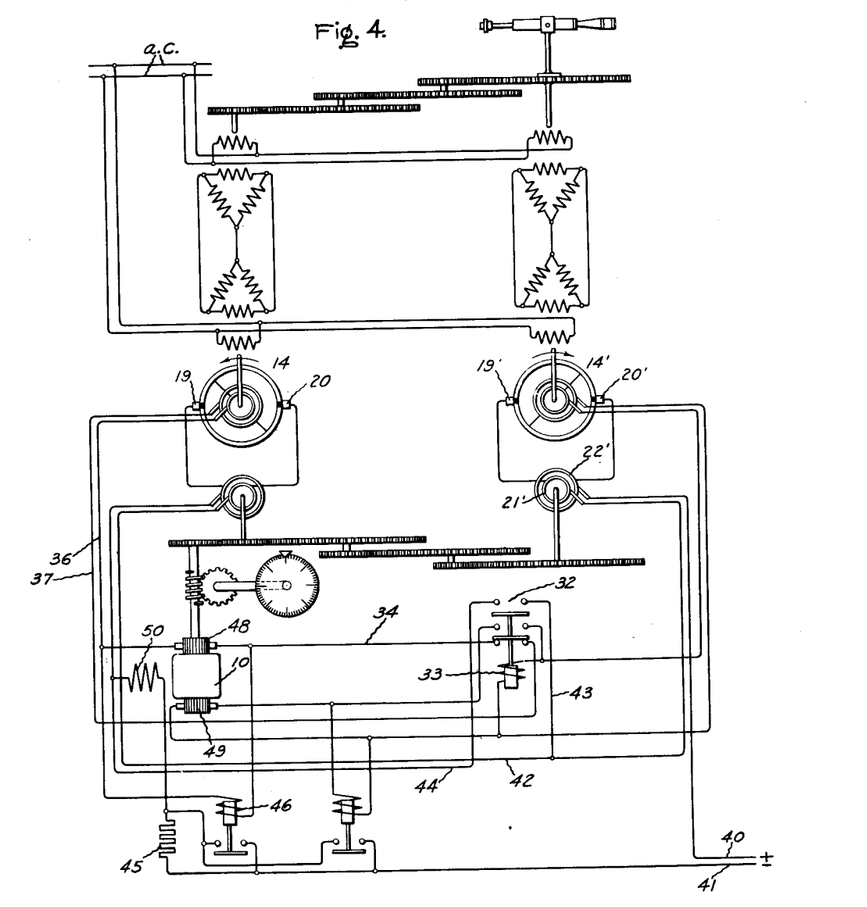

In Fig. 4 we have shown a servo motor provided with two armature windings and a single field, instead of two field windings and a single armature winding as disclosed in Figs. 1, 2, and 3. In this arrangement the connections of field winding 50, and armatures 48 and 49 are the same as the connections in Fig. 3 for armature 29, and field windings 30 and 31, respectively; otherwise the arrangement shown in Fig. 4 is identical with that shown in Fig. 3. The operation of this modification of our invention will be understood with reference to the description of Fig. 3, bearing in mind the distinctions noted above.

It will be observed that in the modification of our invention shown in Fig. 4, armature 48 is short circuited through commutator 14 when brushes 19 and 20 are moved by the servo motor to neutral position, as shown in the drawing, brushes 19' and 20' having been previously moved to neutral position on commutator 14'. This short circuit for armature 48 leads from the armature through conductor 34, the lower pair of contacts of relay 32, conductor 37, commutator 14, and conductor 36 back to the armature. Since field winding 50 is constantly energized, armature 48 therefore acts as a dynamic brake to bring the servo motor quickly to rest in the desired position. In this manner the servo motor is prevented from overrunning due to its inertia and reversing itself.

Although we have shown our invention in connection with selsyn systems for the transmission of angular movement, it can obviously be used with any system of this character. Obviously more than two receivers can be used for controlling the servo motor if desired.

By arranging the receiving motors mechanically independent of the servo motor so that they freely follow the movement of the controlling device, regardless of the amount of lag of the servo motor, smaller transmitting generators and receiving motors can be used without impairing the accuracy of the system. It will be observed that when the movement of the receiving motor is restrained both the transmitting generator and receiving motor are heated by the equalizing currents in the interconnected armature windings of these devices. We may also operate a plurality of receiving motors from each transmitting generator without overburdening the generators so as to affect the accuracy of the system.

In accordance with the provisions of the Patent Statutes, we have described the principle of operation of our invention, together with the apparatus which we now consider to represent the best embodiment thereof, but we desire to have it understood that the apparatus shown is only illustrative, and that the invention can be carried out by other means.

What we claim as new and desire to secure by Letters Patent of the United States, is:—

1. Means for reproducing angular motions comprising a receiver of the angular movements of an object, a motor provided with field and armature windings, a source of electrical supply for said motor, electrical connections between said field winding and said source whereby said field winding is continuously energized, and control means for said armature operated jointly by said receiver and said motor whereby said armature is energized to start said motor upon movement of said receiver and short circuited to stop said motor when said motor has reproduced the movement of said object.

2. Means for reproducing angular motion comprising a receiver of the angular movements of an object, a motor provided with field and armature windings, a source of electrical supply for said motor, electrical connections between said field winding and said source whereby said field winding is continuously energized, a resistance in series with said field winding, control means for said armature winding operated jointly by said receiver and said motor whereby said armature is connected in circuit with said field winding to start said motor upon movement of said receiver and short circuited to stop said motor when said motor has reproduced the movement of said object, and means responsive to the energization of said armature winding for short circuiting said resistance.

3. Means for reproducing angular motion comprising a receiver of the angular movements of an object, a rotary control device driven by said receiver, an electric motor provided with field and armature windings, a source of electrical supply, conductors connecting said field winding and said control device in series to said supply source whereby said field winding is continuously energized, electrical connections between said control device and said armature whereby said armature is included in the electrical circuit with said field winding to start said motor upon movement of said receiver, and a driving connection between said motor and said control device whereby said armature is short circuited to stop said motor when it has reproduced the movement of said object.

4. The combination in a system for reproducing the angular movements of an object, of a receiver of the angular movements of said object, an electric motor provided with field and armature windings, a control device comprising two relatively rotatable cooperating contact members, driving connections between said members and said receiver and motor respectively, a source of electrical supply, electrical connections between said supply source and said field winding including said contact device whereby said field is energized continuously through said control device, and electrical connections between the armature of said motor and said control device whereby said armature is energized to start said motor upon rotation of one of said contact members by said receiver and short circuited to stop said motor when it has reproduced the movements of said object.

5. The combination in a system for reproducing the angular movements of an object, of a receiver of the angular movements of said object, an electric motor provided with field and armature windings, a source of electrical supply therefor, a rotary contact device comprising two relatively rotatable members, one being provided with a pair of 180 degree conducting segments and the other being provided with oppositely disposed brushes cooperating with said segments and arranged to normally short circuit said segments, driving connections between said members and said receiver and motor respectively, electrical connections whereby the field winding of said motor is connected to said supply source in series with said brushes so as to be continuously energized, electrical connections between said conducting segments and said armature whereby said armature is connected in series with said field winding to start said motor upon rotation of one of said contact members by said receiver and short circuited to stop said motor by movement of the other contact member by said motor when said motor has reproduced the movements of said object.

6. Means for accurately reproducing angular movement comprising an electric motor, a plurality of armature windings for said motor, a resistance in series with the field winding of said motor, coarse and fine receivers of the angular movement of an object, means controlled by the receivers for controlling the energization of said armature windings so as to cause the motor to reproduce the angular movement of the object, and means responsive to the energization of said armature windings for controling said resistance.

7. Means for accurately reproducing angular movement comprising a series electric motor, a plurality of separately energized armature windings for said motor, a resistance in circuit with the field winding for said motor, coarse and fine receivers of the angular movement of an object, and means controlled by the receivers for controlling the energization of said armature windings so as to cause the motor to reproduce the angular movement of the object, and means responsive to the energization of said armature windings for short-circuiting said resistance.

8. Means for accurately reproducing angular movement comprising an electric motor, coarse and fine receivers of the angular movement of an object, and means controlled by the receivers for controlling the motor so as to cause the motor to reproduce the angular movement of the object and for dynamically braking said motor when it has reproduced said angular movement.

9. Means for accurately reproducing angular movement comprising an electric motor, a plurality of armature windings for said motor, coarse and fine receivers of the angular movement of an object, means controlled by the receiver for controlling said armature windings so as to cause the motor to reproduce the angular movement of the object and for short-circuiting one of said armature windings when said angular movement has been reproduced.

10. The combination in a system for reproducing the angular movements of an object, of coarse and fine receivers of the angular movements of said object, an electric motor provided with a field winding and two armature windings, a source of electrical supply for said motor, two rotary contact devices each comprising two relatively rotatable members, one of said members being provided with a pair of 180° conducting segments and the other being provided with a pair of oppositely disposed brushes cooperating with said segments and arranged to normally short circuit said segments, driving connections between said receivers and one member of each contact device respectively, driving connections between said motor and the other members of said contact devices, electrical connections whereby the field winding of said motor is connected to said supply source in series with said pairs of brushes so as to be continuously energized, electrical connections between said armature windings and said pairs of conducting segments respectively whereby said armatures are connected in series with said field winding to start said motor upon rotation of one contact member by said receivers and short circuited to stop said motor by movement of the cooperating contact member by said motor, means for opening the circuit of the armature winding controlled by said high speed receiver when the other armature winding is energized, and means for opening the circuit of the armature winding controlled by said low speed receiver when the latter armature winding is short circuited by its contact device.

In witness whereof, we have hereunto set our hands and seals this 14th day of September 1921.

EDWARD M. HEWLETT.
WALDO W. WILLARD.